(12) United States Patent
Sowani et al.

(10) Patent No.: US 9,785,890 B2
(45) Date of Patent: Oct. 10, 2017

(54) DATA-DRIVEN PRODUCT GROUPING

(75) Inventors: Amit Sowani, Bangalore (IN); Eeshan Malhotra, New Delhi (IN); Shafi Ur Rahman, Bangalore (IN)

(73) Assignee: FAIR ISAAC CORPORATION, Roseville, MN (US)

(*) Notice: Subject to any disclaimer, the term of this patent is extended or adjusted under 35 U.S.C. 154(b) by 902 days.

(21) Appl. No.: 13/572,528

(22) Filed: Aug. 10, 2012

(65) Prior Publication Data

US 2014/0046895 A1 Feb. 13, 2014

(51) Int. Cl.
*G06N 99/00* (2010.01)
*G06Q 30/02* (2012.01)

(52) U.S. Cl.
CPC .......... *G06N 99/005* (2013.01); *G06Q 30/02* (2013.01); *G06Q 30/0201* (2013.01)

(58) Field of Classification Search
USPC ...................... 705/10, 7.31; 706/20
See application file for complete search history.

(56) References Cited

U.S. PATENT DOCUMENTS

| | | | | |
|---|---|---|---|---|
| 5,615,109 A * | 3/1997 | Eder | ...................... | G06Q 10/06 705/35 |
| 5,794,209 A * | 8/1998 | Agrawal et al. | ............ | 705/7.11 |
| 6,301,579 B1 * | 10/2001 | Becker | | |
| 7,899,691 B1 * | 3/2011 | Lee | ........................ | G06Q 10/02 705/5 |
| 8,909,626 B2 * | 12/2014 | Park | .................. | G06F 17/30699 707/723 |
| 8,924,264 B2 * | 12/2014 | Tuzhilin | ............ | G06F 17/30412 705/26.7 |
| 9,110,969 B2 * | 8/2015 | Li | ...................... | G06F 17/30595 |
| 9,372,913 B2 * | 6/2016 | Hartlaub | ........... | G06F 17/30592 |
| 2002/0184172 A1 * | 12/2002 | Shlain et al. | ................... | 706/20 |
| 2003/0088480 A1 * | 5/2003 | Berghofer | .............. | G06Q 30/02 705/26.1 |
| 2005/0004819 A1 * | 1/2005 | Etzioni | .................. | G06Q 10/02 705/5 |
| 2005/0189415 A1 * | 9/2005 | Fano | .................... | G06Q 10/087 235/383 |

(Continued)

OTHER PUBLICATIONS

Rajaraman, A. & Ullman, J.D., Clustering, Mining of Massive Datasets, 2011, (pp. 225-228).*

*Primary Examiner* — Crystol Stewart
(74) *Attorney, Agent, or Firm* — Mintz Levin Cohn Ferris Glovsky and Popeo, P.C.

(57) ABSTRACT

Data for a plurality of entities that can be offered a plurality of products can be obtained. The data can include categorical data and numeric data. Based on business constraints, some of all of the data can be selected. The selected data can be converted to another set of numeric data, wherein the categorical values are converted to numeric values. Dimensions of the converted data can be reduced to generate another set of data. Based on this another set of data, clusters of entities can be formed. The products can be grouped by assigning a unique product identifier of each product to a corresponding cluster. This grouping of products can be used by a predictive model to predict a likelihood of an entity to purchase a particular product in a future time period. Related methods, apparatus, systems, techniques and articles are also described.

31 Claims, 5 Drawing Sheets

(56) References Cited

U.S. PATENT DOCUMENTS

| | | | |
|---|---|---|---|
| 2006/0265259 A1* | 11/2006 | Diana | G06Q 30/08 |
| | | | 705/35 |
| 2008/0104349 A1* | 5/2008 | Maruyama | G06F 3/0613 |
| | | | 711/165 |
| 2008/0162268 A1* | 7/2008 | Gilbert | G06Q 10/06375 |
| | | | 705/7.29 |
| 2008/0215602 A1* | 9/2008 | Samson et al. | 707/101 |
| 2008/0313165 A1* | 12/2008 | Wu et al. | 707/5 |
| 2011/0178845 A1* | 7/2011 | Rane et al. | 705/7.31 |
| 2011/0208681 A1* | 8/2011 | Kuecuekyan | 706/21 |
| 2013/0046727 A1* | 2/2013 | Jones | G06F 17/18 |
| | | | 706/52 |
| 2014/0279794 A1* | 9/2014 | Aliferis | G06F 3/0481 |
| | | | 706/46 |
| 2014/0289011 A1* | 9/2014 | Rubin | G06Q 30/0202 |
| | | | 705/7.31 |
| 2014/0289174 A1* | 9/2014 | Statnikov | G06N 99/005 |
| | | | 706/12 |
| 2014/0304035 A1* | 10/2014 | Davis | G06F 17/30533 |
| | | | 705/7.31 |
| 2016/0300144 A1* | 10/2016 | Santhanam | G06Q 30/0631 |

* cited by examiner

DATA-DRIVEN PRODUCT GROUPING

TECHNICAL FIELD

The subject matter described herein relates to generating groupings of products that can be used by a predictive model.

BACKGROUND

Products are conventionally grouped based on their utility. Such a grouping may provide minimal or no information, because purchase patterns for various products belonging to a same group can vary significantly. Thus, it can be disadvantageous to perform a utility based grouping that does not group products according to purchase patterns associated with the products.

SUMMARY

The current subject matter describes generating groupings of products that can be used by a predictive model. Data for a plurality of entities that can be offered a plurality of products can be obtained. The data can include categorical data and numeric data. The data can be converted to another set of numeric data, wherein the categorical values are converted to numeric values. Dimensions of the converted data can be reduced to generate another set of data. Based on this another set of data, clusters of entities can be formed. The products can be grouped by assigning a unique product identifier of each product to a corresponding cluster. This grouping of products can be used by a predictive model to predict a likelihood of an entity to purchase a particular product in a future time period. Related methods, apparatus, systems, techniques and articles are also described.

In one aspect, data for a plurality of entities that are offered a plurality of products can be obtained. The data can include a first set of categorical data and a first set of numeric data. The data can be converted to a first set of data. The first set of data can include a second set of numeric data. From variables associated with the first set of data, one or more variables can be selected. Based on the selected one of more variables, dimensions of the first set of data can be reduced to generate a second set of data. Based on the second set of data, clusters associated with corresponding entities can be generated. A unique product identifier of each product can be assigned to a corresponding cluster to generate groupings of products. Using the groupings of products and for one or more entities, a likelihood of an entity to purchase a particular product in a time period in future can be predicted.

In some variations, one or more of the following can optionally be included. The first set of categorical data can include categorical values for categorical attributes including at least one of a gender and a residential status associated with one or more of a plurality of entities.

The first set of numeric data can include numeric values for numeric attributes including at least one of credit score, risk score and credit line utilization associated with one or more of a plurality of entities.

The converting of the data to the first set of data can include: associating a similarity value with the categorical values based on frequency of co-occurrence of categorical values in the data; and assigning numeric values to the categorical values based on the similarity value.

More specifically, the converting of the data to the first set of data can include: normalizing the first set of numeric data; determining, from the first set of categorical data, a base categorical attribute that is associated with a number of categorical values that is more than a number of categorical values associated with other categorical attributes; determining, from the first set of numeric data, a base numeric attribute that is associated with numeric values that have a sum of associated variances that is less than a sum of associated variances of numeric values of other numeric attributes; constructing, using co-occurrence of categorical values associated with categorical attributes and numeric values associated with numeric attributes, a co-occurrence matrix; calculating a similarity value associated with each pair of the categorical values; assigning, to each categorical value associated with the base categorical attribute and to produce at least a first portion of the first set of data, a mean of corresponding numeric values of the base numeric attribute; and assigning, to each categorical value associated with other categorical attributes and to produce at least a second portion of the first set of data, a value characterized by: $\Sigma_{i=1}^{d} a_i * v_i$, wherein: d can be a number of base categorical values in the base categorical attribute, $a_i$ can be the similarity value associated with the categorical value of the other categorical attributes and $i^{th}$ base categorical value of the base categorical attribute, and $v_i$ can be the mean of corresponding numeric values of the base numeric attribute.

The similarity value can be characterized by:

$$D_{XY} = \frac{m(X, Y)}{m(X) + m(Y) - m(X, Y)},$$

wherein: X can be a first categorical value; Y can be a second categorical value; $D_{XY}$ can be a similarity value characterizing similarity between the first categorical value X and the second categorical value Y; m(X) can be a number of occurrences of the first categorical value X; m(Y) can be a number of occurrences of the second categorical value Y; and m(X,Y) can be a number of simultaneous occurrences of the first categorical value X and the second categorical value Y.

The second set of numeric data can include the first portion of the first set of data and the second portion of the first set of data. The first set of data can exclude categorical data. The one or more variables can characterize one or more characteristics of an entity. The one of more variables can characterize at least one of life-stage and lifestyle of an entity.

The reducing of the dimensions can include reducing, based on the one or more variables, duplicate data from the first set of data to generate the second set of data. The reducing of the duplicate data from the first set can include removing some data associated with two or more attributes that can characterize common information. The two or more attributes can include income and value of property.

The generating of the clusters associated with corresponding entities can include: generating a plurality of points in space such that distance between any two points can be more than a threshold; allocating each entity to a corresponding cluster that is closest to the entity; generating a plurality of new points in space such that distance between any two new points is more than the threshold; and re-allocating each entity to a corresponding cluster that is closest to the entity to generate the clusters associated with the corresponding entities. The plurality of new points can be the centroids of all the entities allocated to each cluster.

The generating of the plurality of new points and the re-allocating is iteratively performed until location of the plurality of new points in two consecutive iterations is maintained. The closeness between an entity and a corresponding cluster can be characterized by a difference between a numerical value of an entity and a mean numerical value associated with all entities of a cluster.

The unique product identifier can be a stock keeping unit associated with a product.

The assigning of the unique product identifier of each product to a corresponding cluster can include: assigning the unique product identifier of each product to a cluster associated with a highest value of relative transactions ratio that is characterized by mathematically dividing a numerator by a denominator, the numerator being a percentage of transactions of the product associated with unique product identifier by entities associated with a corresponding cluster, the denominator being a percentage of transactions of all products by entities associated with the corresponding cluster. The assignment to the cluster associated with the highest value of relative transactions ratio can be performed when the highest value can be more than a threshold value.

The likelihood of the entity to purchase the particular product in the time period in future can be a probability of the entity to purchase the particular product in the time period in future.

In another aspect, dimensions of a first set of data can be reduced to generate a second set of data. Based on the second set of data, clusters associated with a plurality of entities that are offered a plurality of products can be generated. A unique product identifier of each product can be assigned to a corresponding cluster to generate groupings of products.

In some variations, one or more of the following can be implemented. Demographic data comprising a first set of categorical data and a first set of numeric data can be obtained. The demographic data can be converted to the first set of data. The first set of data can include a second set of numeric data. The demographic data can be associated with a plurality of dimensions. The first set of data can characterize continuous data.

The converting can include: associating a similarity value with the categorical values based on frequency of co-occurrence of categorical values in the data; and assigning numeric values to the categorical values based on the similarity value.

The reducing of the dimensions can include: reducing, by removing some data associated with two or more attributes that characterize common information, duplicate data from the first set of data.

The generating of the clusters associated with corresponding entities can include: generating a plurality of points in space such that distance between any two points is more than a first threshold; allocating each entity to a corresponding cluster that is closest to the entity; generating a plurality of new points in space such that distance between any two new points is more than a second threshold; and re-allocating each entity to a corresponding cluster that is closest to the entity to generate the clusters associated with the corresponding entities, wherein the generating of the plurality of new points and the re-allocating is iteratively performed until location of the plurality of new points in two consecutive iterations is maintained. The plurality of new points can be the centroids of all the entities allocated to each cluster.

The assigning of the unique product identifier of each product to a corresponding cluster can include: assigning the unique product identifier of each product to a cluster associated with a highest value of relative transactions ratio that is characterized by mathematically dividing a numerator by a denominator, the numerator being a percentage of transactions of the product associated with unique product identifier by entities associated with a corresponding cluster, the denominator being a percentage of transactions of all products by entities associated with the corresponding cluster, wherein the assignment to the cluster associated with the highest value of relative transactions ratio is performed when the highest value is more than a threshold value.

Further, using the groupings of products and for a particular entity, probability of occurrence of an event in a time period in future can be predicted. The event can characterize a purchase of a particular product by an entity.

In yet another aspect, dimensions of a first set of data can be reduced to generate a second set of data. Based on the second set of data, clusters associated with a plurality of entities that are offered a plurality of products can be generated. A unique product identifier of each product can be assigned to a corresponding cluster to generate groupings of products.

In some variations, one or more of the following can be implemented. Demographic data including a first set of categorical data and a first set of numeric data can be obtained. The demographic data can be converted to the first set of data. The first set of data can include a second set of numeric data. Using the groupings of products and for one or more entities, a likelihood of an entity to purchase a particular product in a time period in future can be predicted.

Computer program products are also described that comprise non-transitory computer readable media storing instructions, which when executed by at least one data processors of one or more computing systems, causes at least one data processor to perform operations herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems.

The subject matter described herein provides many advantages. For example, the generation of groups of products can allow accurate predictions of likelihood of purchase. The accurate predictions can allow an optimal distribution of products to entities by a merchant. According to an example, entities can be provided products according to selected variables, such as lifestyle of entity and life-stage of entity. For example, entities with an expensive lifestyle can be offered expensive products whereas entities with inexpensive lifestyle can be offered inexpensive products. Further, entities can be offered products according to their life-stage (for example, age). Furthermore, a single individual can be offered discounts on small packages, while a family can be offered discounts on large packages. Such an optimal distribution can result in business benefits, such as low cost, high revenue, high profit, human resource optimization, and other business benefits. Further, the described implementations can be used in multiple different industrial segments, such as retail, insurance, finance, healthcare, and any other segment.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
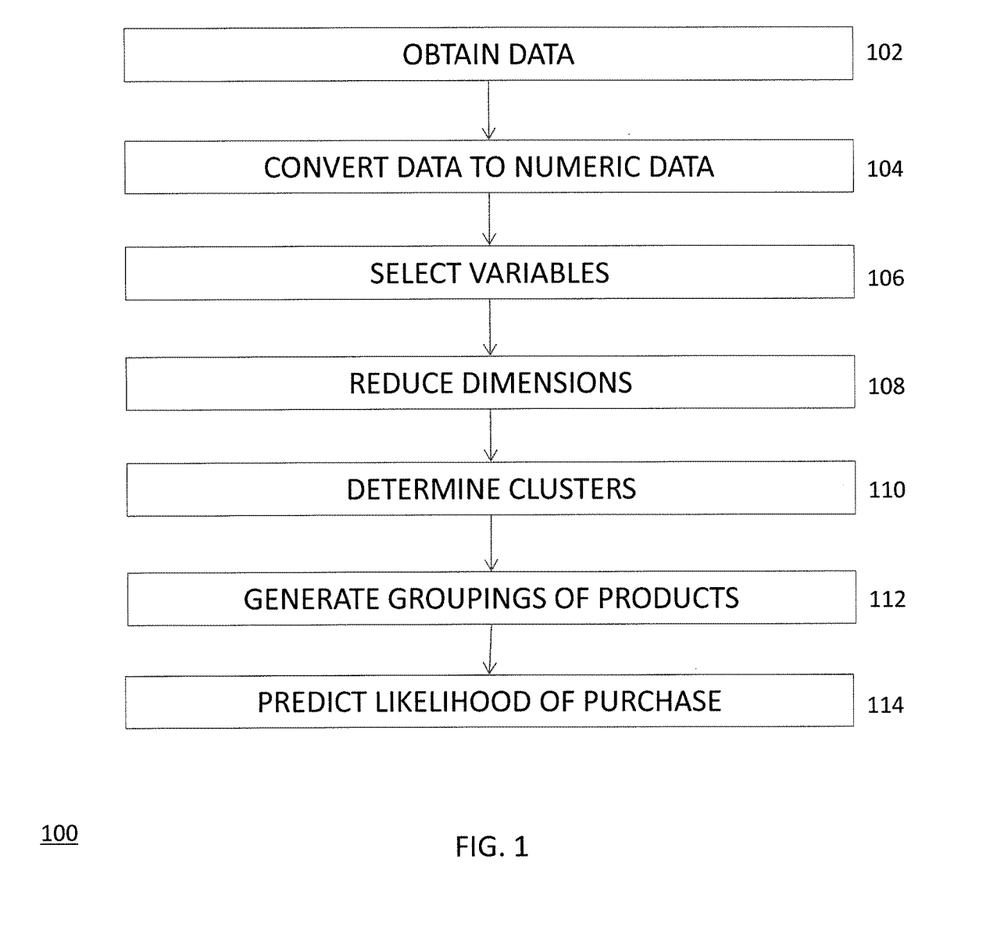
FIG. 1 is a flowchart illustrating generation of groupings of products and use of the generated groupings by a predictive model for predicting likelihood of purchase of a product by an entity.

FIG. 1 is a flowchart 100 illustrating generation of groupings of products and use of the generated groupings by a predictive model for predicting likelihood of an event, such as a purchase of a product by an entity.

Data can be obtained at 102 for a plurality of entities that, in turn, can be offered a plurality of products. The data can be obtained either from a same computer where the data is obtained, or from a remote location and via a network. The network can be a either wired network, or a wireless network, such as a local area network, wide area network, intranet, internet, Bluetooth network, infrared network, or any other network. The entities can be customers of one or more merchants, individuals, clients, institutions, businesses, corporations, partnerships, and/or any other entities. The products can be commodities, services, offers, discounts, profits, and/or any other product. Some examples of products can be a radio, a television, one or more services by a clinician, profits of a firm, profits on stocks, and/or the like. The data can include a first set of categorical data and a first set of numeric data. The categorical data can include categorical values for categorical attributes, such as gender of entity, residential status of entity, and any other categorical attribute. The categorical values can be either male or female, either renter or home-owner, and any other categorical value. The numeric data can include risk score of entity, credit line utilization of entity, and any other numeric data.

The data can be converted, at 104, to a first set of data. The first set of data can include a second set of numeric data. The second set of numeric data can be continuous data. Continuous data can include continuous variables that can take any numeric value in a range for a particular entity. Such a numeric value can have values in steps. Some examples of continuous variables can be speed of an automobile that can lie within a range of 0 miles/hour and 220 miles/hour. A zip code of an entity may not be a continuous variable, because the zip code can be fixed for an entity. The first set of data can have only numeric values. To convert the data to the first set of data, the categorical data can be converted into corresponding numerical data. Such a conversion is described below in more detail.

The first set of data can characterize variables, such as life-stage of entity, lifestyle of entity, and other variables. Each variable can be characterized-by or correlated-with one or more corresponding attributes. For example, life-stage can be characterized-by/correlated-with attributes such as age, health parameters, and other attributes. The variable lifestyle can be characterized-by/correlated-with attributes such as spending score/index, size of house, credit card limit, credit limit utilization, and other attributes.

From the variables associated with the first set of data, one or more variables can be selected at 106. This selection can be made as per the preferences indicated by a designer. The selection can be made based on business constraints, such as profit, cost, human resources, compliance requirements, and any other constraint. A design of the final groupings of products can be based on such selection of variables. A change in the selection can vary the final grouping of products. Thus, the groupings of products, which are discussed below, can be advantageously varied by changing the selection of variables. In one implementation, the selected variables can be life-stage of entity and lifestyle of entity.

Based on the selected one or more variables, dimensions of the first set of data can be reduced, at 108, to generate a second set of data. The dimensions can be different attributes of the first set of data (for example, different column headings in a table characterizing the first set of data). The reduction of dimensions can remove or reduce duplicate data. For example, when two attributes are correlated (for example, attributes income and value of property are highly correlated), the data can be merged and some duplicate data removed. Such a merger of some data and removal of other duplicative data reduce dimensions. For example, the data for the two attributes (1) income and (2) value of property can be represented by a single attribute (i) financial value, which can characterize the two attributes (1) income and (2) value of property.

The reduction of dimensions can be performed using mathematical procedures that can use orthogonal transformation to convert a set of observations of possibly correlated attributes to a set of values of linearly uncorrelated attributes. In one example, this mathematical procedure can be a principal component analysis technique, wherein the linearly uncorrelated attributes can be called principal components. If two or more attributes characterize the same/similar information (that is, if those two or more attributes are correlated), this same/similar information can be extracted and represented using a single attribute. Such a conversion can avoid duplicity of information while allowing for capturing a large fraction of data with a lesser number of attributes. In some examples, if the first set of data is reasonably correlated, it can be possible to capture about 90% of the information in the first set of data by uncorrelated attributes that can be about 20% of the total number of attributes in the first set of data. Thus, such a reduction of dimensions can advantageously optimize computing resources, such as processing power, memory, and any other computing resource.

Based on the second set of data that has the reduced dimensions, clusters associated with corresponding entities can be generated at 110. Each cluster can contain demographically similar entities. This clustering is described in more detail below.

A unique product identifier of each product can be assigned to a corresponding cluster to generate, at 112, groupings of products. Such a grouping of products can be called data-driven product grouping. The unique product identifier can be unique for each product. In one example, the unique product identifier can be a stock keeping unit associated with a product. The assigning of the unique product identifier of each product to a corresponding cluster can include: assigning the unique product identifier of each product to a cluster associated with a highest value of relative transactions ratio (RTR) that can be characterized by mathematically dividing a numerator by a denominator, wherein: the numerator can be a percentage of transactions of the product associated with unique product identifier by entities associated with a corresponding cluster, and the denominator can be a percentage of transactions of all products by entities associated with the corresponding cluster. The assignment to the cluster with the highest value of relative transactions ration can be performed when the highest value is more than a threshold value. Such a grouping of products is described below with respect to TABLES 1 and 2.

The relative transaction ratio (RTR) can be defined mathematically as:

$$RTR = \frac{\% \text{ of transactions of that } SKU \text{ by customers belonging to that cluster}}{\% \text{ of all transactions by customers belonging to the cluster}}$$

TABLE 1 illustrates purchases of products across five entity clusters. Each product can be associated with a unique product identifier, such as a stock keeping unit (SKU).

TABLE 1

|       | Cluster 1 | Cluster 2 | Cluster 3 | Cluster 4 | Cluster 5 | Total  |
|-------|-----------|-----------|-----------|-----------|-----------|--------|
| SKU 1 | 70        | 80        | 370       | 960       | 860       | 2340   |
| SKU 2 | 20        | 40        | 190       | 780       | 660       | 1690   |
| ...   | ...       | ...       | ...       | ...       | ...       | ...    |
| Total | 6300      | 12900     | 54000     | 228000    | 198000    | 499200 |

From TABLE 1, the relative transactions ratio of SKU 1 can be computed by mathematically dividing a numerator by a denominator, the numerator being a percentage of transactions of the product associated with unique product identifier by entities associated with a corresponding cluster, the denominator being a percentage of transactions of all products by entities associated with the corresponding cluster. That is, relative transactions ratio of SKU 1 with respect to cluster 1=(70/2340)/(6300/499200)=2.37. Similarly relative transactions ratio for each SKU with respect to each cluster can be calculated. TABLE 2 illustrates relative transaction values for each SKU with respect to each cluster.

TABLE 2

|       | Cluster 1 | Cluster 2 | Cluster 3 | Cluster 4 | Cluster 5 |
|-------|-----------|-----------|-----------|-----------|-----------|
| SKU 1 | 2.37037   | 1.322997  | 1.461728  | 0.898246  | 0.926599  |
| SKU 2 | 0.937729  | 0.915921  | 1.039316  | 1.010526  | 0.984615  |
| ...   | ...       | ...       | ...       | ...       | ...       |

As noted in TABLE 2, SKU 1 has a significantly larger relative transactions ratio (2.37037) in cluster 1 than other SKUs associated with cluster 1. Thus, SKU 1 can be assigned to cluster 1. As noted in TABLE 2, SKU 2 does not display purchase behavior specific to any of the five entity clusters, as all relative transactions ratios are less than a threshold of 1.5. This threshold can be varied, wherein the variation can be performed based on business constraints. So, values other than 1.5 can also be used as the threshold. Thus, SKU 2 can be assigned to a catcall cluster 0. Similarly, each SKU can be assigned to a corresponding cluster so as to obtain groupings of products.

Using the groupings of products and for one or more entities (each entity in some implementations), a likelihood of occurrence of an event in a time in future can be predicted at 114. The occurrence of an event can be purchase of a particular product by an entity. The likelihood of occurrence of an event can be a probability of occurrence of the event. The prediction can be made by a predictive model, such as a time-to-event scorecard model. In some examples, the predictive model can predict, in a given period of time, likelihood of purchase of milk, likelihood of renewal of car insurance, likelihood of reduction of financial instrument (for example, credit card) users that are clients of a financial institution (for example, bank), likelihood of relapse of cancer, and the like. Thus, the prediction of likelihood based on the groupings of products can be implemented in at least the following segments: retail, insurance, finance, healthcare, and any other segment.

In some implementations, recency and frequency associated with a same (or similar) event in a past time period can also be used by the predictive model to determine likelihood of occurrence of an event in a time in future. Recency of an event can characterize how recently the event occurred. Frequency of an event can characterize how often an event occurred in a predetermined period of time in the past. In one example, when a predictive model determines likelihood of purchase of a product, recency and frequency of purchase of the same (or similar) product in a past time period (for example, most recent two days, most recent five days, most recent ten days, most recent twenty days, most recent one month, most recent two months, most recent five months, or any other time period) can be additionally used by the predictive model. In some implementations, a common recency and frequency values can be associated with all products in a grouping of products.

While the predictive model noted above is described as a time to event scorecard model, other scorecard models can also be used. Further, use of other predictive models can also be possible, such as group method of data handling model, naïve Bayes classifier model, k-nearest neighbor algorithm model, majority classifier model, support vector machine model, logistic regression model, uplift modeling model, and any other predictive model.

The predicted likelihood of purchase of a particular product can be displayed to a merchant that can accordingly decide regarding decisions associated with distribution of products to entities. The display can be provided on a graphic user interface on a display device. The display device can be a computer, a tablet computer, a laptop, a fixed mall/store computer, or any other display device. The display device can further include at least one of a cathode ray tube display, a light emitting diode display, a liquid crystal display, and any other display.

Figure 2:
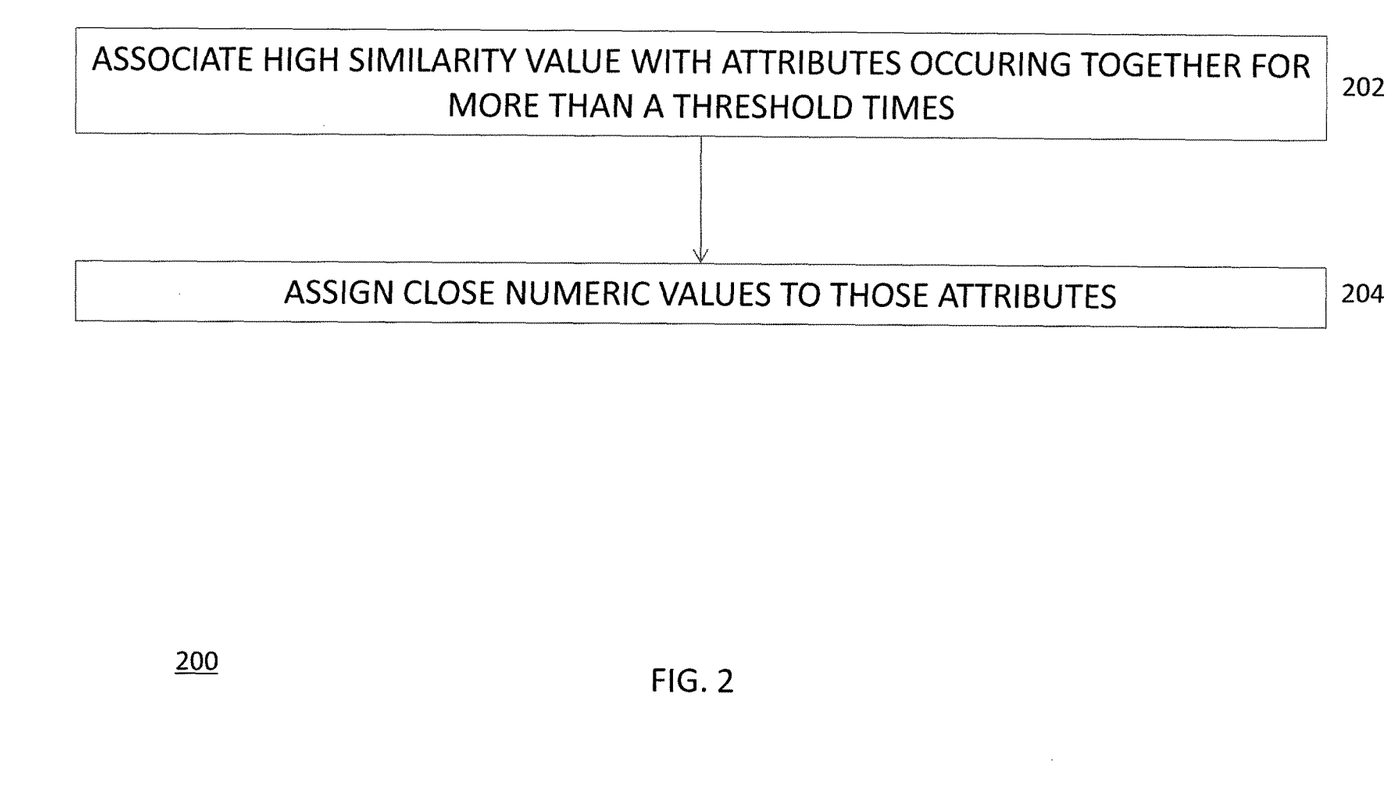
FIG. 2 is a first flowchart illustrating converting a set of categorical and numeric data to a set of numeric data.

FIG. 2 is a first flowchart 200 illustrating converting a set of categorical and numeric data to a set of numeric data. For example, flowchart 200 shows converting of the data to the first set of data, as described with respect to 104. A similarity value can be associated, at 202, with categorical values based on frequency of co-occurrence of the categorical values. More specifically, higher co-occurrence can be assigned a higher similarity value and a lower co-occurrence can be assigned a lower similarity value. Numeric values can be assigned, at 204, to those categorical values associated with the similarity values. Similarly, similarity values can be varied to determine numeric values for other categorical values.

Figure 3:
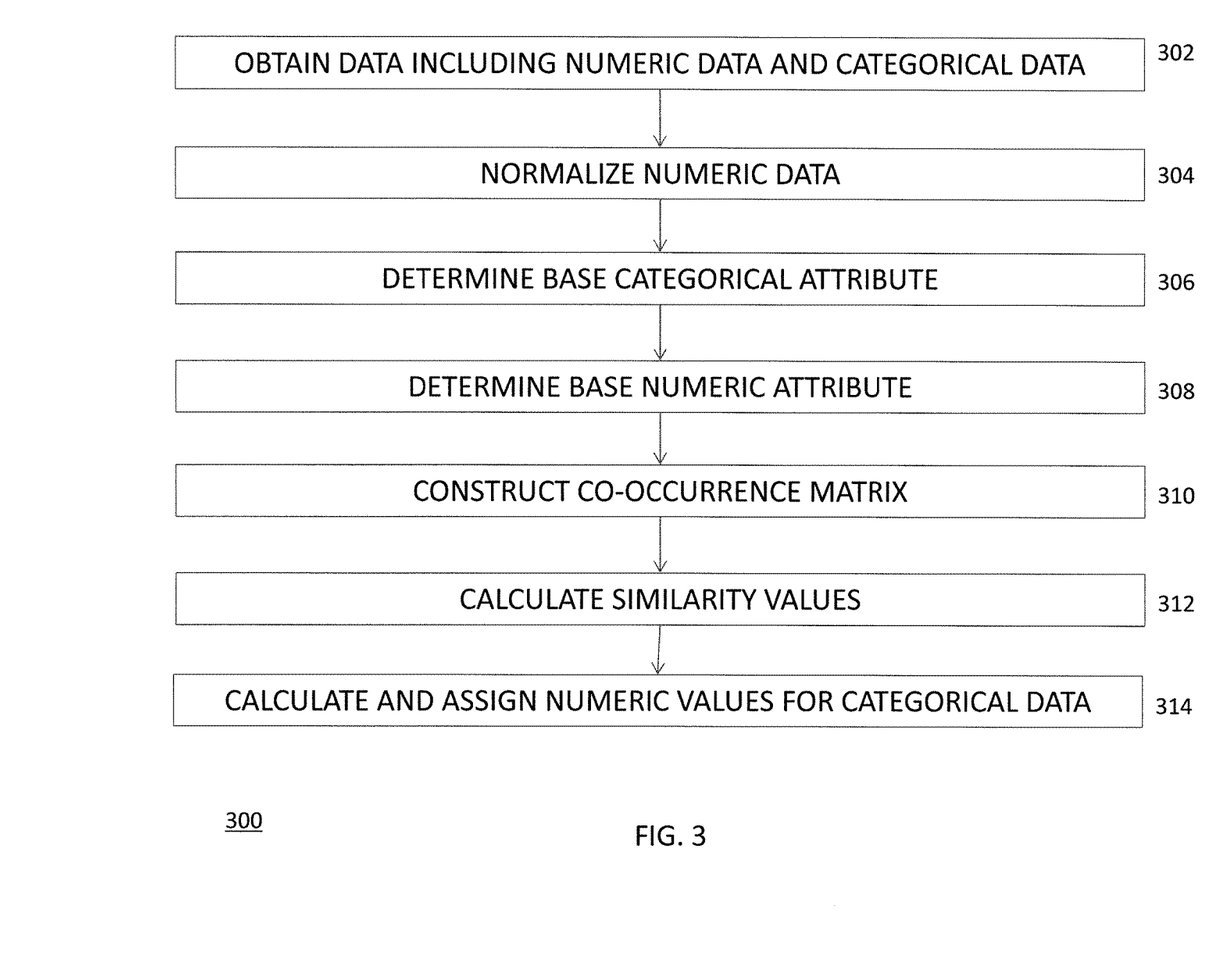
FIG. 3 is a second flowchart illustrating converting a set of categorical and numeric data to a set of numeric data.

FIG. 3 is a second flowchart 300 illustrating converting a set of categorical and numeric data to a set of numeric data. For example, flowchart 300 shows converting of the data to the first set of data, as described with respect to 104.

Data containing the first set of categorical data and the first set of numeric data can be obtained at 302.

The first set of numeric data can be normalized at 304. Co-occurrence can be determined for categorical values. That is, number of co-occurrences (or other co-occurrence statistics) can be determined for each set (or one or more sets) of two or more categorical values.

TABLE 3 illustrates an example of a normalized dataset.

TABLE 3

| Attribute W | Attribute X | Attribute Y | Attribute Z |
|---|---|---|---|
| A | C | 0.1 | 0.1 |
| A | C | 0.3 | 0.9 |
| A | D | 0.8 | 0.8 |
| B | D | 0.9 | 0.2 |
| B | C | 0.2 | 0.8 |
| B | E | 0.6 | 0.9 |
| A | D | 0.7 | 0.1 |

From the first set of categorical data, a base categorical attribute can be determined at 306. The base categorical attribute can be a categorical attribute that has most number of categorical values. That is, the base categorical attribute can be associated with a number of categorical values that is more than a number of categorical values associated with other categorical attributes. The values of the base categorical attribute can be termed base categorical values.

From the first set of numeric data, a base numeric attribute can be determined at 308. The base numeric attribute can be associated with numeric values that have the minimum sum of in-group variances with respect to each categorical value of the base categorical variable. That is, the base numeric attribute is associated with numeric values that have a sum of associated variances that is less than a sum of associated variances of numeric values of each of other numeric attributes. Using the example of TABLE 3, the numeric attribute that has a minimum sum of within-group variance can be the attribute Y, which is also termed as the base attribute. That is, the base numeric attribute is associated with numeric values that have a sum of associated variances that is less than each sum of associated variances of numeric values of each of other numeric attributes.

Figure 4:
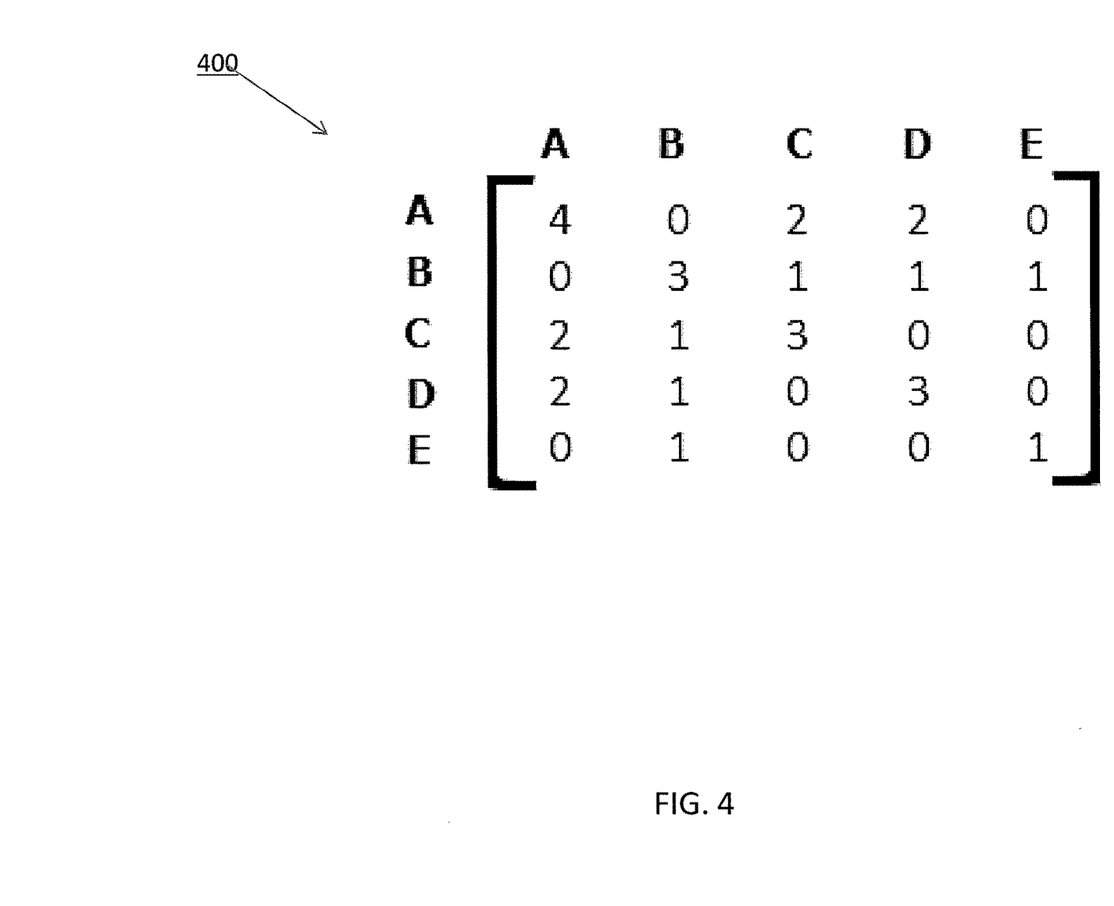
FIG. 4 is a diagram illustrating an exemplary co-occurrence matrix.

Using co-occurrence of categorical values associated with categorical attributes and of numeric values associated with numeric attributes, a co-occurrence matrix can be constructed at 310. FIG. 4 is a diagram illustrating an exemplary co-occurrence matrix 400.

A similarity value associated with each pair of the categorical values can be calculated at 312. The similarity value can be evaluated using the following equation:

$$D_{XY} = \frac{m(X,Y)}{m(x) + m(Y) - m(X,Y)},$$

wherein: X is a first categorical value; Y is a second categorical value; $D_{XY}$ is a similarity value characterizing similarity between the first categorical value X and the second categorical value Y; m(X) is a number of occurrences of the first categorical value X; m(Y) is a number of occurrences of the second categorical value Y; and m(X,Y) is a number of simultaneous occurrences of the first categorical value X and the second categorical value Y.

Using TABLE 3, the some of the similarity values can be calculated as: $D_{AC}$=2/(4+3−2)=0.4; $D_{AD}$=2/(4+3−2)=0.4; $D_{AE}$=0/(4+1−0)=0; and so on.

The numeric values for categorical data can then be calculated and assigned at 314. To produce at least a first portion of the first set of data, a mean of corresponding numeric values of the base numeric attribute can be calculated and assigned to each categorical value associated with the base categorical attribute. To produce at least a second portion of the first set of data, a value characterized by the following equation can be calculated and assigned to each categorical value associated with other categorical attributes: $\Sigma_{i=1}^{d} a_i * v_i$, wherein: d is a number of base categorical values in the base categorical attribute, $a_i$ is the similarity value associated with the categorical value of the other categorical attributes and $i^{th}$ base categorical value of the base categorical attribute, and $v_i$ is the quantified numeric value assigned to the $i^{th}$ base value of the base categorical variable determined at 306. The quantified numeric value can be a mean of corresponding values of the base attributes. The first portion of the first set of data and the second portion of the first set of data can form the second set of numeric data.

Continuing using the example of TABLE 3, the base attribute Y can be used to determine numeric values for categorical values of base categorical attribute, which is assumed here to be attribute X. A mean of corresponding numeric values of the base numeric attribute Y can be calculated and assigned to each categorical value associated with the base categorical attribute X. Accordingly, the numeric values for the base categorical values can be calculated as: C=(0.1+0.3+0.2)/3=0.2; D=(0.8+0.9+0.7)/3=0.8; and E=(0.6)/1=0.6. Based on these numeric values of the base categorical values C, D, and E, numeric values for other categorical values can be obtained by implementing the equation: $\Sigma_{i=1}^{d} a_i * v_i$, which uses similarity values, as noted above. For example, value of A can be calculated as: A=$\Sigma_{i=1}^{d} a_i * v_i$=($D_{AC}$*numeric value of C)+($D_{AD}$*numeric value of D)+($D_{AE}$*numeric value of E)=(0.4*0.2)+(0.4*0.8)+(0*0.6)=0.4. Similarly, numeric value for categorical variable B can be determined.

Figure 5:
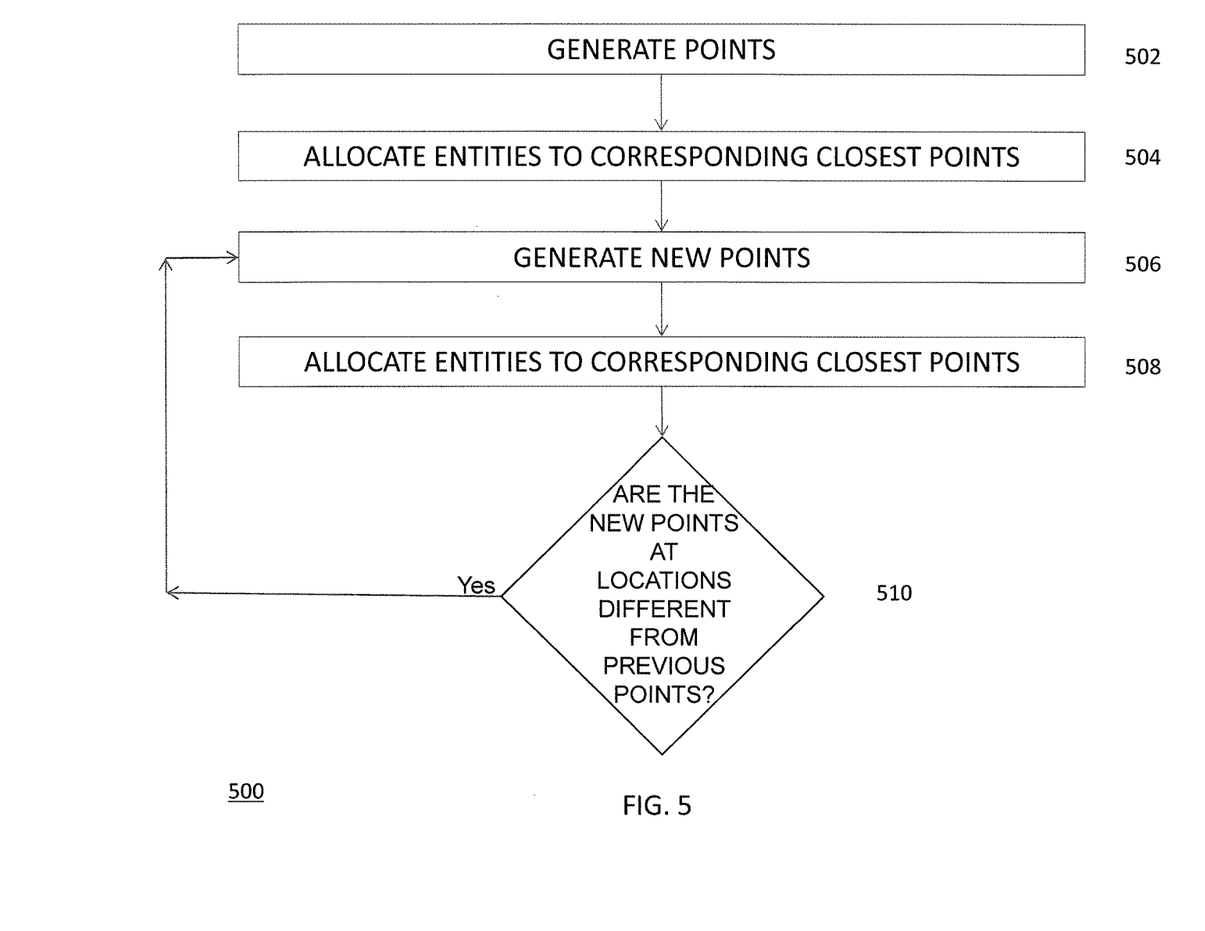
FIG. 5 is a flowchart illustrating generation of clusters associated with corresponding entities.

FIG. 5 is a flowchart 500 illustrating generation of clusters associated with corresponding entities. This clustering is also noted above with respect to 110. Each cluster can contain demographically similar entities. A plurality of points (for example, centroids) can be generated, at 502, in space such that distance between any two points can be more than a first threshold (for example, a predetermined threshold). Each entity can be allocated, at 504, to a corresponding cluster that is closest to the entity. A plurality of new points (for example, new centroids) can be generated, at 506, in space such that distance between any two new points can be more than a second threshold (for example, second predetermined threshold). The first threshold can be equal to the second threshold. Each entity can be re-allocated, at 508, to a corresponding cluster that can be closest to the entity. The generating of the plurality of new points and the re-allocating can be iteratively performed until location of the plurality of new points in two consecutive iterations can be maintained. The closeness between an entity and a corresponding cluster can be characterized by a distance between an entity and a mean associated with all entities of a cluster. The distance can be defined by a difference between a numerical value of an entity and a mean numerical value associated with all entities of a cluster.

Various implementations of the subject matter described herein can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) can include machine instructions for a programmable processor, and can be implemented in a high-level procedural and/or object-oriented programming language, and/or in assembly/machine language. As can be used herein, the term "machine-readable medium" can refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. As can be used herein, the term "machine-readable signal" can refer to any signal used to provide machine instructions and/or data to a programmable processor.

Although a few variations have been described in detail above, other modifications are possible. For example, the logic flows depicted in the accompanying figures and described herein do not require the particular order shown, or sequential order, to achieve desirable results. Other embodiments may be within the scope of the following claims.

What is claimed is:

1. A non-transitory computer program product storing instructions that, when executed by at least one programmable processor, cause the at least one programmable processor to perform operations comprising:

obtaining data for a plurality of entities that are offered a plurality of products, the data comprising a first set of categorical data and a first set of numeric data;

converting the data to a first set of data, the first set of data comprising a second set of numeric data, the converting of the data to the first set of data comprising: normalizing the first set of numeric data;

determining, from the first set of categorical data, a base categorical attribute that is associated with a number of categorical values that is more than a number of categorical values associated with other categorical attributes;

determining, from the first set of numeric data, a base numeric attribute that is associated with numeric values that have a sum of associated variances that is less than a sum of associated variances of numeric values of other numeric attributes;

constructing, using co-occurrence of categorical values associated with categorical attributes and numeric values associated with numeric attributes, a co-occurrence matrix;

calculating a similarity value associated with each pair of the categorical values; and assigning, to each categorical value associated with the base categorical attribute and to produce at least a first portion of the first set of data, a mean of corresponding numeric values of the base numeric attribute;

selecting, from variables associated with the first set of data, one or more variables;

reducing, based on the one or more variables, dimensions of the first set of data to generate a second set of data, the reducing of the dimensions by removing duplicate data from the first set of data and transforming a larger number of correlated attributes to a lesser number of linearly uncorrelated attributes;

increasing storage capacity of the non-transitory computer program product and speed of processing of existing data in the non-transitory computer program product by the at least one programmable processor by associating the linearly uncorrelated attributes and the removal of the duplicate data;

generating, based on the second set of data, clusters associated with corresponding entities;

assigning a unique product identifier of each product to a corresponding cluster to generate groupings of products; and predicting, using the groupings of products and for one or more entities, a likelihood of an entity to purchase a particular product in a time period in future.

2. The computer program product of claim 1, wherein the first set of categorical data comprises categorical values for categorical attributes comprising at least one of a gender and a residential status associated with one or more of a plurality of entities.

3. The computer program product of claim 1, wherein the first set of numeric data comprises numeric values for numeric attributes comprising at least one of credit score, risk score and credit line utilization associated with one or more of a plurality of entities.

4. The computer program product of claim 1, wherein the converting of the data to the first set of data comprises:

associating a similarity value with the categorical values based on frequency of co-occurrence of categorical values in the data; and assigning numeric values to the categorical values based on the similarity value.

5. The computer program product of claim 1, wherein the converting of the data to the first set of data further comprises:

assigning, to each categorical value associated with other categorical attributes and to produce at least a second portion of the first set of data, a value characterized by: $\sum_{i=1}^{d} a_i * v_i$, wherein:

d is a number of base categorical values in the base categorical attribute, $a_i$ is the similarity value associated with the categorical value of the other categorical attributes and $i^{th}$ base categorical value of the base categorical attribute, and $v_i$ is the mean of corresponding numeric values of the base numeric attribute.

6. The computer program product of claim 5, wherein the similarity value is characterized by:

$$D_{XY} = \frac{m(X, Y)}{m(x) + m(Y) - m(X, Y)}$$

wherein:
X is a first categorical value;
Y is a second categorical value;
$D_{XY}$ is a similarity value characterizing similarity between the first categorical value X and the second categorical value Y;
m(X) is a number of occurrences of the first categorical value X;
m(Y) is a number of occurrences of the second categorical value Y; and
m(X,Y) is a number of simultaneous occurrences of the first categorical value X and the second categorical value Y.

7. The computer program product of claim 5, wherein the second set of numeric data comprises the first portion of the first set of data and the second portion of the first set of data.

8. The computer program product of claim 1, wherein the first set of data excludes categorical data.

9. The computer program product of claim 1, wherein the one or more variables characterize one or more characteristics of an entity.

10. The computer program product of claim 1, wherein the one of more variables characterize at least one of life-stage and lifestyle of an entity.

11. The computer program product of claim 1, wherein the reducing of the dimensions comprises:
reducing, based on the one or more variables, the duplicate data from the first set of data to generate the second set of data,
wherein the transforming of the larger number of correlated attributes to the lesser number of linearly uncorrelated attributes is performed using orthogonal transformation.

12. The computer program product of claim 11, wherein the reducing of the duplicate data from the first set comprises removing some data associated with two or more attributes that characterize common information, wherein the orthogonal transformation is a part of a principal component analysis technique.

13. The computer program product of claim 12, wherein the two or more attributes comprise income and value of property.

14. The computer program product of claim 1, wherein the generating of the clusters associated with corresponding entities comprises:
generating a plurality of points in space such that distance between any two points is more than a threshold;
allocating each entity to a corresponding cluster that is closest to the entity;
generating a plurality of new points in space such that distance between any two new points is more than the threshold; and
re-allocating each entity to a corresponding cluster that is closest to the entity to generate the clusters associated with the corresponding entities.

15. The computer program product of claim 14, wherein:
the generating of the plurality of new points and the re-allocating is iteratively performed until location of the plurality of new points in two consecutive iterations is maintained; and
the plurality of new points characterize centroids of the entities allocated to each cluster.

16. The computer program product of claim 14, wherein the closeness between an entity and a corresponding cluster is characterized by a difference between a numerical value of an entity and a mean numerical value associated with all entities of a cluster.

17. The computer program product of claim 1, wherein the unique product identifier is a stock keeping unit associated with a product.

18. The computer program product of claim 1, wherein the assigning of the unique product identifier of each product to a corresponding cluster comprises:
assigning the unique product identifier of each product to a cluster associated with a highest value of relative transactions ratio that is characterized by mathematically dividing a numerator by a denominator, the numerator being a percentage of transactions of the product associated with unique product identifier by entities associated with a corresponding cluster, the denominator being a percentage of transactions of all products by entities associated with the corresponding cluster.

19. The computer program product of claim 18, wherein the assignment to the cluster associated with the highest value of relative transactions ratio is performed when the highest value is more than a threshold value.

20. The computer program product of claim 1, wherein the likelihood of the entity to purchase the particular product in the time period in future is a probability of the entity to purchase the particular product in the time period in future.

21. A method comprising:
converting, by at least one processor, demographic data comprising a first set of categorical data and a first set of numeric data to a first set of data, the first set of data comprising a second set of numeric data, the converting of the demographic data to the first set of data comprising:
normalizing the first set of numeric data;
determining, from the first set of categorical data, a base categorical attribute that is associated with a number of categorical values that is more than a number of categorical values associated with other categorical attributes;
determining, from the first set of numeric data, a base numeric attribute that is associated with numeric values that have a sum of associated variances that is less than a sum of associated variances of numeric values of other numeric attributes;
constructing, using co-occurrence of categorical values associated with categorical attributes and numeric values associated with numeric attributes, a co-occurrence matrix;
calculating a similarity value associated with each pair of the categorical values; and
assigning, to each categorical value associated with the base categorical attribute and to produce at least a first portion of the first set of data, a mean of corresponding numeric values of the base numeric attribute;
reducing, by at least one processor, dimensions of the first set of data to generate a second set of data, the reducing of the dimensions removing duplicate data and transforming a larger number of correlated attributes to a lesser number of linearly uncorrelated attributes;
increasing, by at least one processor, storage capacity of a memory coupled to the at least one processor by associating the linearly uncorrelated attributes and the removal of the duplicate data;
reducing, by at least one processor and based on the associating of the linearly uncorrelated attributes and the removal of the duplicate data, requirement of processing power received from the at least one processor;

generating, by at least one processor and based on the second set of data, clusters associated with a plurality of entities that are offered a plurality of products; and assigning, by at least one processor, a unique product identifier of each product to a corresponding cluster to generate groupings of products.

22. The method of claim 21, wherein the demographic data is associated with a plurality of dimensions.

23. The method of claim 21, wherein the first set of data characterizes continuous data.

24. The method of claim 21, wherein the converting comprises:
associating a high similarity value with categorical values in the data that occur together for more than a particular number of times; and
assigning close numeric values to the categorical values associated with the high similarity value, the close numeric values characterizing values that are within a predetermined value from each other.

25. The method of claim 21, wherein the reducing of the dimensions comprises:
reducing, by removing some data associated with two or more attributes that characterize common information, duplicate data from the first set of data.

26. The method of claim 21, wherein the generating of the clusters associated with corresponding entities comprises:
generating a plurality of points in space such that distance between any two points is more than a first threshold;
allocating each entity to a corresponding cluster that is closest to the entity;
generating a plurality of new points in space such that distance between any two new points is more than a second threshold, the plurality of new points being centroids of all entities allocated to each cluster; and
re-allocating each entity to a corresponding cluster that is closest to the entity to generate the clusters associated with the corresponding entities,
wherein the generating of the plurality of new points and the re-allocating is iteratively performed until location of the plurality of new points in two consecutive iterations is maintained.

27. The method of claim 21, wherein the assigning of the unique product identifier of each product to a corresponding cluster comprises:
assigning the unique product identifier of each product to a cluster associated with a highest value of relative transactions ratio that is characterized by mathematically dividing a numerator by a denominator, the numerator being a percentage of transactions of the product associated with unique product identifier by entities associated with a corresponding cluster, the denominator being a percentage of transactions of all products by entities associated with the corresponding cluster,
wherein the assignment to the cluster associated with the highest value of relative transactions ratio is performed when the highest value is more than a threshold value.

28. The method of claim 21, further comprising:
predicting, by at least one processor and using the groupings of products and for a particular entity, probability of occurrence of an event in a time period in future.

29. The method of claim 28, wherein the event characterizes a purchase of a particular product by an entity.

30. A system comprising:
at least one programmable processor; and
a machine-readable medium storing instructions that, when executed by the at least one processor, cause the at least one programmable processor to perform operations comprising:
receiving demographic data comprising a first set of categorical data and a first set of numeric data;
converting the demographic data to a first set of data, the first set of data comprising a second set of numeric data, the converting of the demographic data to the first set of data comprising:
normalizing the first set of numeric data;
determining, from the first set of categorical data, a base categorical attribute that is associated with a number of categorical values that is more than a number of categorical values associated with other categorical attributes;
determining, from the first set of numeric data, a base numeric attribute that is associated with numeric values that have a sum of associated variances that is less than a sum of associated variances of numeric values of other numeric attributes;
constructing, using co-occurrence of categorical values associated with categorical attributes and numeric values associated with numeric attributes, a co-occurrence matrix;
calculating a similarity value associated with each pair of the categorical values; and
assigning, to each categorical value associated with the base categorical attribute and to produce at least a first portion of the first set of data, a mean of corresponding numeric values of the base numeric attribute;
reducing dimensions of a first set of data to generate a second set of data, the reducing of the dimensions removing duplicate data from the first set of data and transforming a larger number of correlated attributes to a lesser number of linearly uncorrelated attributes;
increasing storage capacity of the machine-readable medium and speed of the at least one programmable processor to process existing data by associating the linearly uncorrelated attributes and the removal of the duplicate data;
generating, based on the second set of data, clusters associated with a plurality of entities that are offered a plurality of products; and
assigning a unique product identifier of each product to a corresponding cluster to generate groupings of products.

31. The system of claim 30, further performing operations comprising:
predicting, using the groupings of products and for one or more entities, a likelihood of an entity to purchase a particular product in a time period in future.

* * * * *